Patented June 11, 1940

2,204,232

UNITED STATES PATENT OFFICE 2,204,232

VAT DYESTUFFS OF THE ANTHRAQUINONE-ACRIDONE SERIES

Hans Schlichenmaier and Ludwig Wilhelm Berlin, Frankfort-on-the-Main, Germany, assignors to General Aniline & Film Corporation, a corporation of Delaware No Drawing. Application April 7, 1938, Serial No. 200,675. In Germany April 27, 1937

6 Claims. (Cl. 260—277)

The present invention relates to new vat-dyestuffs of the anthraquinone-acridone series.

We have found that new valuable vat-dyestuffs of the anthraquinone-acridone series are obtained by causing a 1-amino-4-halogen-anthraquinone-2-sulfonic acid or a derivative or a substitution product thereof to react with an ortho-amino-carboxylic acid containing a trifluoromethyl group, then transforming the product obtained by ring closure into the 4-amino-anthraquinone-acridone of the general formula:

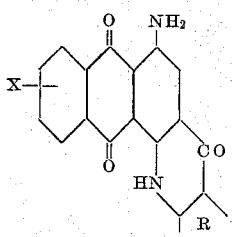

wherein X represents a member of the group consisting of hydrogen and a substituent and R is an aromatic radical containing a trifluoromethyl group, and acylating the substance thus obtained.

The new dyestuffs are distinguished by their vivid shades and are, in this respect, superior to the known dyestuffs having a similar constitution. They possess good tinctorial properties, especially a good fastness to chlorine; they constitute, therefore, a valuable enrichment of the art.

The following examples serve to illustrate the invention, but they are not intended to limit it thereto; the parts are by weight:

(1) 215 parts of an aqueous paste of 1-amino-4-bromanthraquinone-2-sulfonic acid containing 64.7 per cent. of water are diluted with 500 parts of water, and 5 parts of cuprous chloride and 100 parts of potassium acetate are added thereto. Into this mixture 60 parts of 2-amino-4-trifluoromethylbenzoic acid dissolved in 16 parts of sodium carbonate and 200 parts of water are then caused to run in quickly. The mixture is heated, while stirring, at 85° C.–90° C., whereby the condensation is completed after about 6 hours. The product is allowed to stand overnight and is then filtered with suction. The crystalline precipitate is washed with cold water until the washing liquor is only feebly coloured. Instead of 5 parts of cuprous chloride, there may also be used, as condensing agent, 4 parts of finely divided copper powder.

98 parts of the dry condensation product are heated, for about 1 hour, in 1800 parts of sulfuric acid monohydrate at 90° C.–95° C., whereby the acridone ring closure occurs with simultaneous elimination of the sulfonic acid group and the color of the solution turns from blue-green to orange. As soon as this is the case, the solution is poured on ice, the separated dyestuff is filtered with suction and subsequently washed with a hot sodium carbonate solution, until the filtrate runs off in the form of a light-yellow liquor. The new dyestuff is a blue powder which dyes cotton in a violet vat greenish blue tints. The dyeing has a good fastness to chlorine.

The 2-amino-4-omega-trifluoromethyl-benzoic acid used as parent material may be prepared from 2-nitro-4-omega-trifluoromethyl-aniline by replacing the amino group in known manner by a cyano group, then saponifying the product obtained to form the corresponding carboxylic acid and reducing the nitro-carboxylic acid thus obtained to form the amino-carboxylic acid.

(2) 40 parts of the dyestuff obtainable as described in Example 1 are suspended in 700 parts of nitrobenzene and the suspension is heated for 1 hour with 60 parts of benzoyl chloride at 150° C.–160° C. and finally, for a short time, to boiling. The whole is then allowed to cool, the dyestuff which has separated in the form of crystals is filtered with suction and subsequently washed somewhat with alcohol. The new dyestuff has the following constitution:

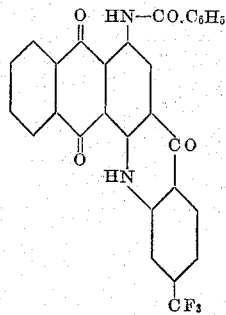

It melts at 360° C. and dissolves in concentrated sulfuric acid to an orange solution; it dyes cotton very vivid blue tints of good fastness to light and to chlorine.

(3) If the dyestuff obtained as described in Example 1 is caused to react instead of with benzoyl chloride with ortho-chlorobenzoyl chloride in the manner indicated in Example 2, a violet dyestuff melting at 328° C. is obtained. It dyes cotton in a violet vat very vivid violet tints.

The dyeings possess a very good fastness to chlorine.

(4) 31 parts of 2-amino-4-omega-trifluoro-methyl-benzoic acid, 44 parts of 1-amino-4-bromo-5-acetylamino-anthraquinone-2-sulfonic acid and 60 parts of potassium acetate in 800 parts of water are heated at 85° C.–90° C., while stirring, 2 parts of cuprous chloride are added and the mixture is kept, for about 3 hours, at a temperature of 95° C. The reaction product which separates, on cooling, in the form of blue-green needles is filtered with suction, washed with a small amount of dilute hydrochloric acid and dried.

53 parts of the acid thus obtained are heated, for 2 hours at a temperature of 95° C., in 500 parts of sulfuric acid monohydrate, whereby ring-closure to the acridone occurs, the sulfo group being simultaneously split off. The cooled solution of the acridone in sulfuric acid is poured on ice, the blue precipitate thereby obtained is filtered with suction and washed with water and a dilute sodium carbonate solution, until the filtrate is colorless. The acridone melting at 400° C., which is obtained after drying, dyes cotton in a violet vat greenish-blue tints.

(5) 7 parts of the acridone obtained as described in example 4 and having the following constitution:

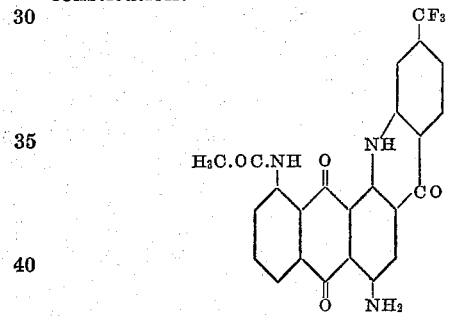

100 parts of dichlorobenzene, 4 parts of benzoyl chloride and 1/10 part of pyridine are heated, for one hour, at a temperature of 140° C.–150° C. and then, for a short time, to boiling. On cooling, the benzoyl compound separates in the form of brown lancets which are isolated as usual; melting point: 358° C. The dyestuff thus obtained dyes cotton in a violet vat blue tints.

(6) 28 parts of 1-amino-4-bromo-6-chloro-anthraquinone-2-sulfonic acid, 20 parts of 2-amino-4-omega-trifluoro-methyl-benzoic acid, 35 parts of potassium acetate and 2 parts of cuprous chloride in 500 parts of water are heated, for 3 hours while stirring, at 90° C.–95° C. The acid is worked up as described in Example 4. It is then ring-closed by heating it in 500 parts of sulfuric acid monohydrate, at 90° C.–95° C., the acridone of the following constitution being formed:

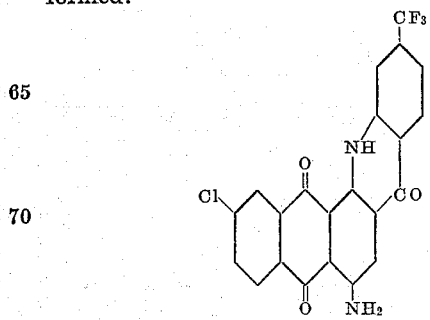

with elimination of the sulfo group. The compound thus obtained melts at about 350° C. and dyes cotton in a violet vat greenish-blue tints.

(7) 5 parts of the acridone obtained as described in Example 6 in 60 parts of chlorobenzene are heated to boiling, for one hour, together with 4 parts of benzoyl chloride and 1/10 part of pyridine, until hydrogen chloride is no longer evolved. After cooling and filtering with suction, the dyestuff is obtained in the form of light-brown needles melting at 335° C. It dyes cotton and artificial silk in the vat reddish-blue tints which are fast to chlorine.

(8) 9.5 parts of 1-amino-4-bromanthraquinone-2-sulfonic acid in 90 parts of water are heated at 90° C.–95° C., for about 2–3 hours, together with 13 parts of potassium acetate, 2½ parts of cuprous chloride and 9 parts of 4-omega-trifluoromethyl-chloranthranilic acid (obtainable by chlorinating, by means of chlorine, in the presence of nitrobenzene and a small amount of iodine, at a temperature of 60° C., the compound:

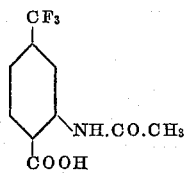

and saponifying the product obtained). The acid, which separates on cooling, is filtered with suction, dried and ring-closed in 100 parts of sulfuric acid monohydrate to form the acridone of the following constitution:

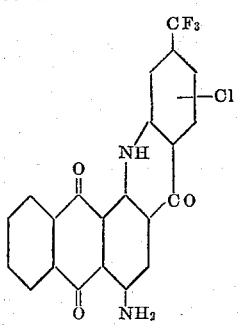

melting point: 392/393° C. The dyestuff dyes cotton in a violet vat a beautiful, clear greenish-blue tint.

(9) 4 parts of the 4-amino-anthraquinone-acridone obtained as described in example 8 in 70 parts of dichlorobenzene are heated to boiling, for one hour, together with 4 parts of 3-fluoro-benzoyl chloride and 1/10 part of pyridine until the evolution of hydrogen chloride is terminated. The dyestuff is isolated in the usual manner; it dyes cotton and artificial silk a blue tint which is fast to chlorine and distinguished by its beautiful, clear shade.

If there is used, instead of meta-fluorobenzoyl chloride, 3-methylbenzoyl chloride or also benzoyl chloride, vivid blue dyestuffs having similarly good properties are obtained.

(10) If in Example 2 the benzoyl chloride used therein is replaced by the corresponding amount of meta-tolylic acid chloride, a blue dyestuff is obtained which melts at 318° C.–320° C. and dyes cotton in a violet vat beautiful blue tints which are fast to chlorine and to washing. Similarly valuable dyestuffs may be obtained by using meta-methoxybenzoyl chloride.

(11) If in Example 2 meta-chlorobenzoyl chloride is substituted for the benzoyl chloride, a dyestuff is obtained which melts at 330° C. and dyes cotton clear blue tints which are entirely fast to chlorine and to washing.

(12) If in Example 2 the benzoyl chloride is replaced by meta-fluorobenzoyl chloride, a dyestuff is obtained which melts at 390° C. and dyes cotton in a violet vat particularly clear blue tints being entirely fast to chlorine.

(13) 11 parts of 1-amino-4-bromanthraquinone-2-sulfonic acid, 6.3 parts of 2-amino-3-omega-trifluoromethyl-benzoic acid, 14 parts of potassium acetate and 1 part of copper powder in 100 parts of water are heated, for 2-3 hours, at 95° C. The reaction product is worked up as described in the preceding examples.

The product obtained is, in the manner indicated in the preceding examples, treated in 50 parts of sulfuric acid monohydrate, whereby the acridone of the following formula:

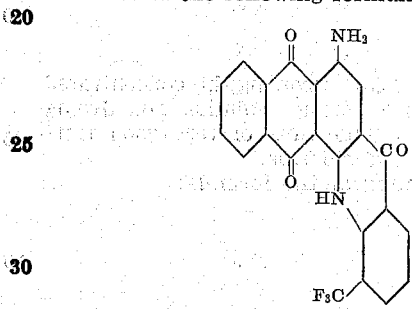

is formed, the sulfo group being split off. This compound, which melts at 375° C., is benzoylated and a dyestuff is thus obtained which crystallizes from nitrobenzene in the form of violet needles melting at 315° C. and dyes cotton in the vat a very reddish-blue tint.

The 2-amino-3-omega-trifluoromethylbenzoic acid used as parent material may be prepared as follows:

Omega-trifluoromethylbenzene is nitrated to form the meta-nitro compound (cf. Swarts, Bullentin de l'Académie Royale Belgique (3), 35, page 375 et sqs.). This nitro compound is reduced, in known manner, to form the amino compound and then acetylated. The meta-acetylamino-omega-trifluorobenzene melts at 107° C.–108° C. By nitrating this compound, at −10° C., by means of nitric acid (specific gravity 1.52) a mixture of three isomeric mononitrocompounds is obtained. By fractionally crystallizing this mixture from alcohol, two isomers may be separated therefrom, namely the compound:

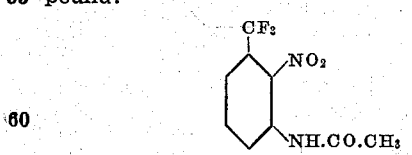

melting at 171° C. and the compound:

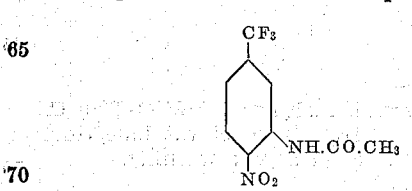

melting at 102° C.–106° C.

The compound melting at 171° C. is then, according to known methods, transformed into the 2-amino-3-omega-trifluoromethylbenzoic acid melting at 160° C. The reaction occurs according to the following scheme:

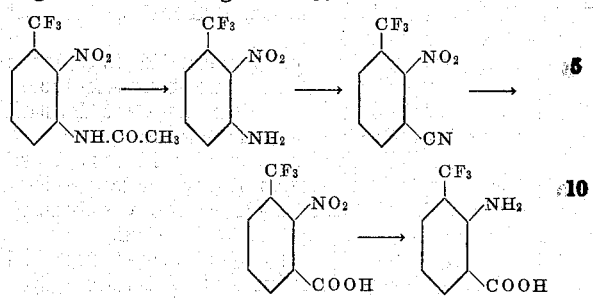

(14) The nitro-acetylamino-omega-trifluoromethylbenzene melting at 102° C.–106° C. named in the last paragraph of the preceding example is transformed, in the manner described in Example 13, into the anthranilic acid melting at about 189° C. and, subsequently, into the corresponding dyestuff.

(15) If in Example 13 the 2-amino-3-omega-trifluoromethyl-1-benzoic acid is replaced by the 2-amino-4-chloro-6-omega-trifluoromethylbenzoic acid, a similar dyestuff is obtained, after benzoylating, which dyes reddish-blue tints, melts at 345° C. and has the following constitution:

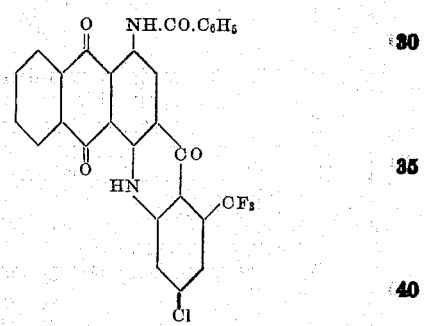

The 2-amino-4-chloro-6-omega-trifluoromethylbenzoic acid used as parent material melts at 180° C.–184° C. and may be prepared as follows: 6-amino-3-chloro-1-omega-trifluoromethylbenzene (German Patent No. 637,318) is acetylated and nitrated, at −10° C., by means of nitric acid having the specific gravity of 1.5. A nitro compound is, thereby, formed which is, according to the following reaction scheme, transformed into the 2-amino-4-chloro-6-omega-trifluoromethylbenzoic acid:

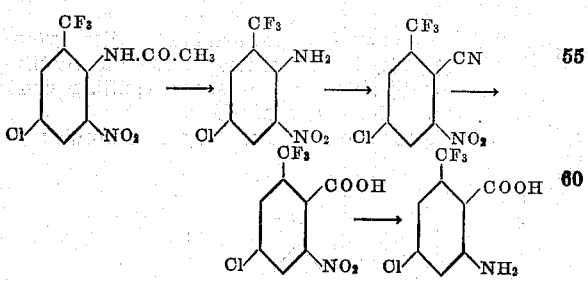

The amino-acridone prepared from this anthranilic acid melts at 355° C.

(16) If in Example 2 the benzoyl chloride is replaced by the equivalent amount of terephthalic acid chloride, a clear blue vat-dyestuff is obtained which does not melt when heated up to 400° C.

If in Example 2 the benzoyl chloride is replaced by the equivalent amount of cinnamic acid chloride, a clear blue vat-dyestuff is obtained which melts at 312° C.

If in Example 2 the benzoyl chloride is replaced by the equivalent amount of tetrahydrobenzoyl chloride, a clear blue vat-dyestuff melting at 325° C. is obtained.

If in Example 2 the benzoyl chloride is replaced by the equivalent amount of naphthalene-1-carboxylic acid chloride, a clear blue vat-dyestuff melting at 296° C.–298° C. is obtained.

If in Example 2 the benzoyl chloride is replaced by the equivalent amount of naphthalene-2-carboxylic acid chloride, a clear blue vat-dyestuff melting at 310° C.–312° C. is obtained.

If in Example 2 the benzoyl chloride is replaced by the equivalent amount of 5.6.7.8-tetrahydronaphthalene-2-carboxylic acid chloride, a clear blue vat-dyestuff melting at 305° C. is obtained.

We claim:

1. The compounds of the general formula:

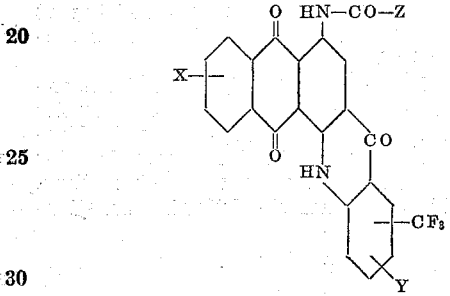

wherein X represents a member of the group consisting of hydrogen, chlorine and acetylamino, and Y represents a member of the group consisting of hydrogen and halogen, Z being a member of the group consisting of phenyl, naphthyl, tetrahydrophenyl and tetrahydronaphthyl radicals, being vat-dyestuffs yielding vivid tints of good fastness properties.

2. The compounds of the general formula:

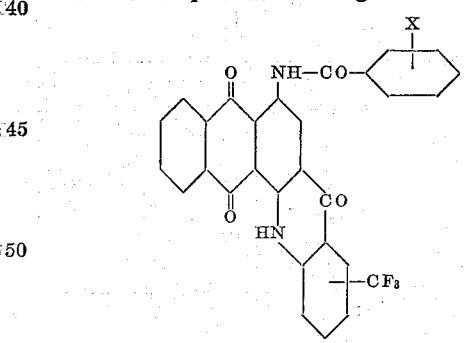

wherein X represents a member of the group consisting of hydrogen, chlorine, fluorine, methyl and methoxy, being vat-dyestuffs yielding vivid tints of good fastness properties.

3. The compounds of the general formula:

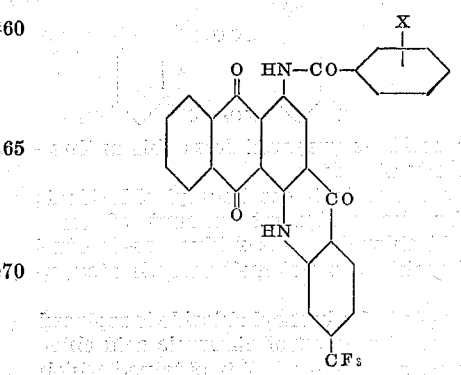

wherein X represents a member of the group consisting of hydrogen, chlorine, fluorine, methyl and methoxy, being vat-dyestuffs yielding vivid tints of good fastness properties.

4. The compound of the formula:

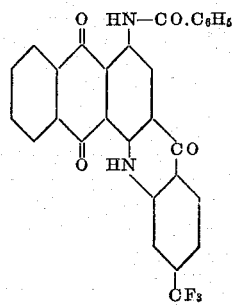

melting at 360° C., dissolving in concentrated sulfuric acid to an orange solution and dyeing cotton very vivid blue tints of very good fastness to light and to chlorine.

5. The compound of the formula:

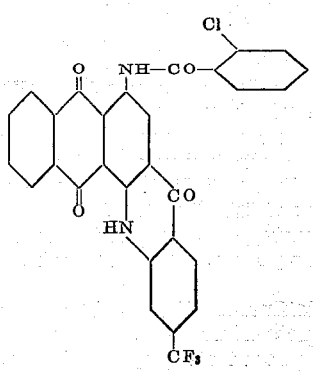

being a violet dyestuff melting at 328° C. and dyeing cotton from a violet vat very vivid violet tints of a very good fastness to chlorine.

6. The compound of the formula:

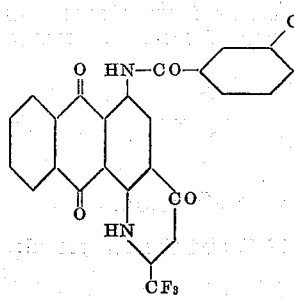

being a blue dyestuff melting at 318° C.–320° C. and dyeing cotton from a violet vat blue tints of good fastness to chlorine and washing.

HANS SCHLICHENMAIER.
LUDWIG WILHELM BERLIN.